United States Patent [19]
Kolb et al.

[11] 3,987,936
[45] Oct. 26, 1976

[54] STREWING APPARATUS FOR GARDEN USE

[75] Inventors: Walter Kolb; Dieter Achenbach, both of Betzdorf, Sieg, Germany

[73] Assignee: Wolf-Gerate GmbH, Germany

[22] Filed: Oct. 2, 1974

[21] Appl. No.: 511,116

[30] Foreign Application Priority Data
Oct. 15, 1973    Germany............................ 2351689

[52] U.S. Cl................................. 222/177; 222/485
[51] Int. Cl.²...................................... A01C 15/00
[58] Field of Search.................. 239/650, 679, 680; 222/177, 565, 575, 176, 485, 486

[56] References Cited
UNITED STATES PATENTS

| | | |
|---|---|---|
| 3,179,298 | 4/1965 | Collins................................ 222/177 |
| 3,239,107 | 3/1966 | West et al............................ 222/177 |
| 3,240,401 | 3/1966 | Kirschmann.................... 222/575 X |
| 3,580,426 | 5/1971 | Manning............................. 222/177 |

*Primary Examiner*—Evon C. Blunk
*Assistant Examiner*—Michael Mar
*Attorney, Agent, or Firm*—Ostrolenk, Faber, Gerb & Soffen

[57] ABSTRACT

Strewing apparatus for distributing seed, fertilizer, etc. in a garden, including a wheel on which the apparatus moves, a strewing shaft driven by motion of the wheel, a strewing means on the strewing shaft; an interchanging proportion and distributing plate on the side of the housing of the device, which plate has holes therethrough and shaped so as to desirably proportion the exit of material from the device.

5 Claims, 9 Drawing Figures

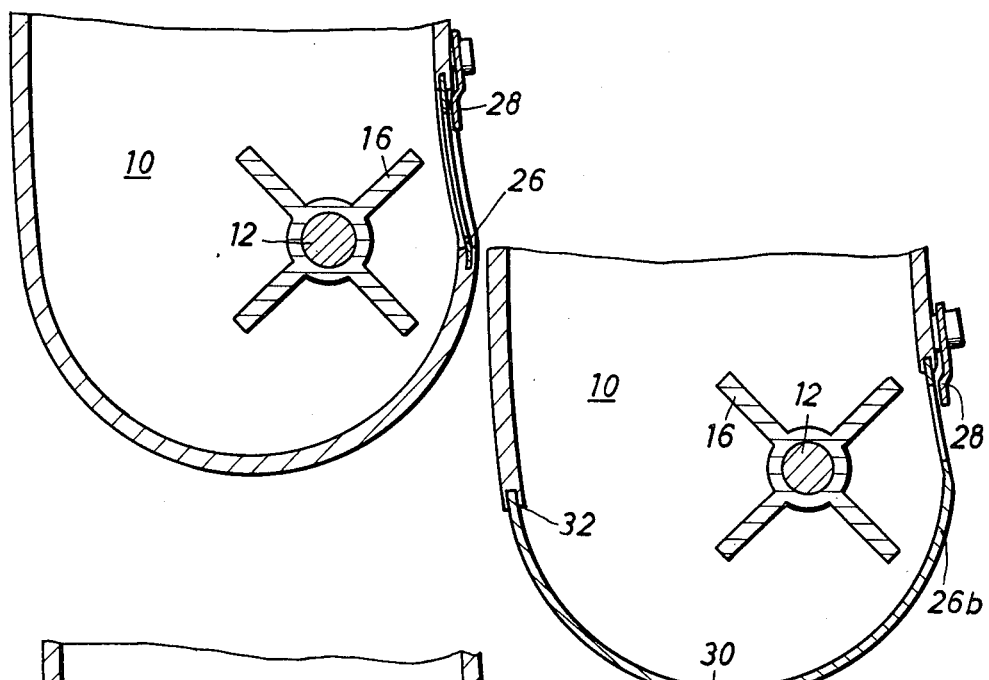
Fig.3
Fig.5
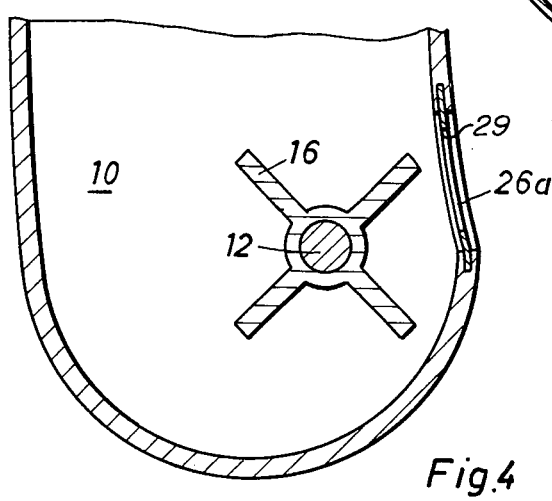
Fig.4

STREWING APPARATUS FOR GARDEN USE

The invention relates to a strewing carriage for garden operation for proportioned dispensing of seeds, fertilizers, plant protective agents and similar strewable material, comprising a container which is supported by wheels, is open at the top for filling and is provided with at least one proportioning hole row extending over its width, adjacent which a strewing shaft driven by the wheels is mounted.

Such strewing carriages, which have widely proved themselves, permit exact strewing of material between the wheels, avoiding erroneous or double strewing. The material is always applied in exact paths in uniform proportion.

Strewing carriages used hitherto were made from steel sheet and equipped with plastic wheels. If such strewing carriages are used only to spread grass seeds or the like, the lacquer coating of the container provides adequate protection. However, such carriages are frequently used to spread aggressive agents such as fertilisers or weed killers and salts, which in conjunction with mechanical abrasion can lead to corrosion at areas of the sheet metal container where the lacquer coating comes off.

Attempts have already been made to obviate the disadvantage of the inadequate corrosion resistance by making the container completely from plastic. However, this results in serious disadvantages as regards the strewing of the materials. The properties of plastics make it impossible to form the strewing openings or proportioning holes in the plastic body with the necessary precision. As a result, the amount strewed cannot be set exactly and the quantity varies over the width between the two wheels. When such carriages are used to spread aggressive agents, for example weed killers, salt, etc., this may lead to injury to the plants in the strewing area due to corrosive caustic action.

The problem underlying the invention is therefore to provide a strewing carriage which with absolute resistance to corrosion ensures exact strewing of a predetermined quantity per unit area.

According to the invention this problem is solved in a strewing carriage of the type mentioned at the beginning in that the container made from plastic is provided with a proportioning plate comprising the proportioning hole row. The proportioning openings may be arranged in any desired form and size in this proportioning plate, which preferably consists of stainless sheet metal, thus ensuring uniform spreading over the track defined by the wheels.

According to a further development of the invention the stainless steel sheet inserts comprising the proportioning hole rows are interchangeable to allow differentiated strewing openings to be used depending on the material dispensed. Instead of this, or in addition thereto, cover slides may be provided in a manner known per se which permit adjustment of the size of the discharge openings.

An exact proportioning can however always be obtained by interchangeable sheets without additional proportioning slides.

According to a further development of the invention a further metallic insert is provided for the plastic container and support the strewing shaft. This insert is preferably made integral with the strewing plate comprising the proportioning openings or the support thereof. As a result the distance between the strewing shaft and the discharge openings can be very accurately made and maintained, which is of decisive importance as regards uniform strewing.

Some examples of embodiment of the invention will be described hereinafter with the aid of the drawings, wherein:

FIG. 3 to 5 are examples of embodiment of plastic containers with proportioning plates of stainless material moulded into position

Figures 1, 2:
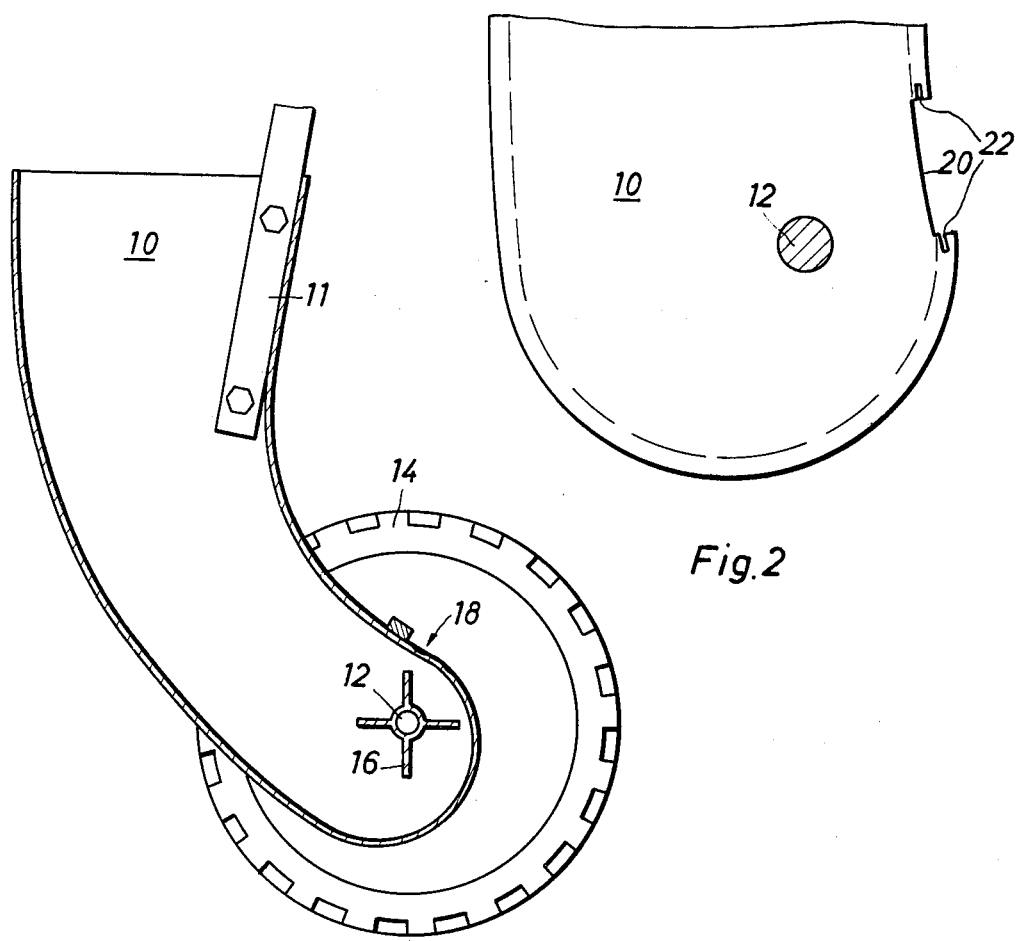
FIG. 1 is a sectional view of a strewing carriage.
FIG. 2 is a view of the lower container portion of the carriage according to FIG. 1 to a larger scale.

The strewing carriage comprises a relatively narrow elongated container 10 whose funnel-shaped crosssection is apparent from FIG. 1. The container is made from plastic and supports in the lower portion a shaft 12 which carries at both ends projecting from the container a wheel 14 and also supports within the container a rotary star 16 and thus simultaneously serves as strewing shaft. The handle 11 is shown broken away on the container 10.

The star 16 of this strewing moves rotatably past the vicinity of the openings 18, which are only indicated schematically in FIG. 1.

FIG. 2 shows the lower portion of the container comprising a strip-shaped recess 20 which extends parallel to the shaft 12 over the entire width and which is disposed in the container wall and comprises upper and lower grooves 22 for inserting a strewing plate of stainless steel which may have rows of holes of different size and shape.

In the examples of embodiment according to FIGS. 3 to 5 strewing rails 26 have been incorporated into the plastic of the container 10 during moulding. A proportioning plate, for example according to FIGS. 7–9, may be clamped over the rail 26 according to FIG. 3 by means of a clamping device 28. The rail 26a according to FIG. 4 is itself provided with a row of porportioning holes as openings 29 of corresponding size. In the embodiment according to FIG. 5 the plate rail 26b is extended to form a bottom portion 30 which is then the bottom of the container 10 and is secured by moulding in the container wall at the end 32 opposite the row of proportioning openings.

Figure 6:
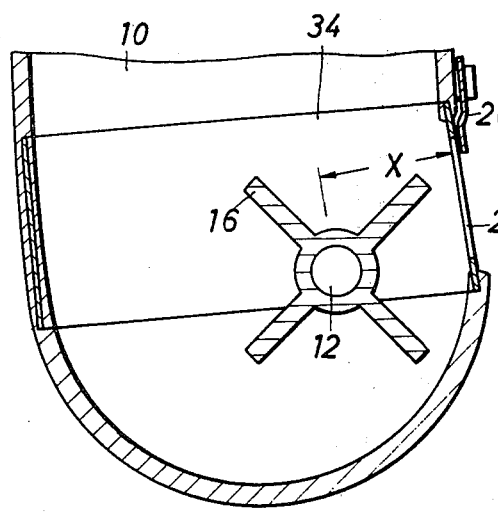
FIG. 6 shows a container with molded strewing roller bearing.

FIG. 6 shows a further example of embodiment of the invention in which a sheet metal frame 34 of stainless steel is moulded into the plastic container 10. Said frame carries at the front the proportioning plate rail 26 and also supports the strewing shaft 12 so that the distance between the shaft 12 and plate 26 (dimension X) may be made very accurately. This accuracy is of great importance for the effect of the star 16 and thus also for uniform dispensing.

Figure 7:
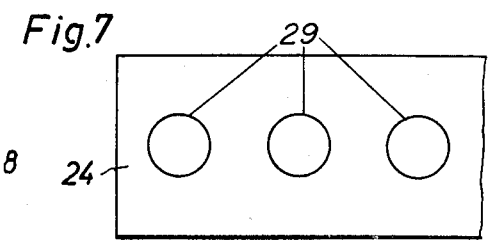
FIG. 7 to 9 show views of various proportioning plates.
Figure 8:
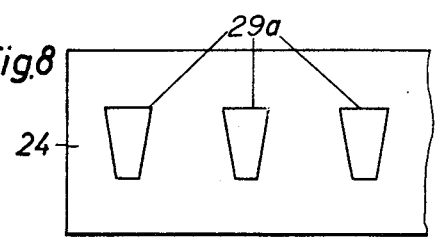
Figure 9:
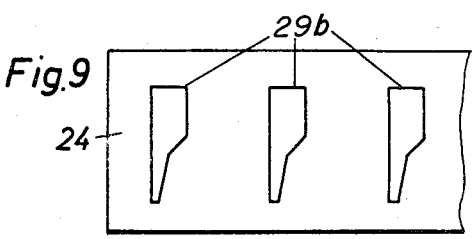

In the example of embodiment according to FIG. 7 the proportioning openings 29 are made circular whereas the openings 29a according to FIG. 8 are trapezoidal and tapered downwardly. In the example of embodiment according to FIG. 9 the proportioning sheet has polygonal proportioning openings 29b with tapered lower portion.

We claim:

1. A strewing carriage for garden operation for proportioned dispensing of seeds, fertilizers, plant protective agents and similar strewable material, comprising:
   a fillable container having an open top and a closed bottom;
   a strewing shaft extending through said container;
   a respective wheel of a pair of wheels being mounted at each end of said strewing shaft and positioned outside said container; said container having a recess extending through a wall thereof and oriented parallel to said strewing shaft; said strewing shaft being near said recess;
   a proportioning plate having at least one row comprising a plurality of shaped, spaced proportioning openings extending through said plate and along the length of said proportioning plate; said plate being of dimensions to fill said recess;
   means for removably mounting said proportioning plate to fill said recess and at an orientation such that said at least one row of proportioning openings is generally parallel to said strewing shaft;
   the shape, size, position and number of said proportioning openings being predeterminately established to enable uniform spreading of a selected strewable material;
   said removable mounting means comprising a plurality of rails, each rail having a first portion molded into the wall of said container along at least a portion of the periphery of said recess and a remaining portion extending into said recess for mounting said proportioning plate.

2. A strewing carriage according to claim 1, further comprising a clamping device to clamp a proportioning plate against said remaining portion of said mounting rails.

3. A strewing carriage according to claim 2, wherein a portion of said container forming said closed bottom is releasable, a first end of said releasable bottom portion forming an edge of said recess and having at least one of said mounting rails molded therein, an opposed end of said releasable bottom portion merging with the wall of said container in flexible manner to form a hinge; said first end adapted to be separated from the wall of said container to open said bottom portion.

4. A strewing carriage according to claim 1, wherein said container is formed of a plastic material and said proportioning plate is formed of a stainless metallic material.

5. A strewing carriage for garden operation for proportioned dispensing of seeds, fertilizers, plant protective agents and similar strewable material, comprising;
   a fillable container having an open top and a closed bottom;
   a strewing shaft extending through said container;
   a respective wheel of a pair of wheels being mounted at each end of said strewing shaft and positioned outside said container; said container having a recess extending through a wall thereof and oriented parallel to said strewing shaft; said strewing shaft being near said recess;
   a proportioning plate having at least one row comprising a plurality of shaped, spaced proportioning openings extending through said plate and along the length of said proportioning plate; said plate being of dimensions to fill said recess;
   means for removably mounting said proportioning plate to fill said recess and at an orientation such that said at least one row of proportioning openings is generally parallel to said strewing shaft;
   the shape, size, position and number of said proportioning openings being predeterminately established to enable uniform spreading of a selected strewable material;
   and a box-shaped frame molded into the wall of said container; a first side of said frame having an opening extending therethrough in alignment with said recess; the edges of said opening forming said removable mounting means; a pair of opposed sides of said frame adjacent said first side being adapted to support said strewing shaft near said opening and said recess.

* * * * *